United States Patent [19]

Solomon

[11] 4,425,414
[45] Jan. 10, 1984

[54] BATTERY

[76] Inventor: Howard Solomon, 921 NW. 198 St., Miami, Fla. 33169

[21] Appl. No.: 432,275

[22] Filed: Dec. 14, 1982

[51] Int. Cl.³ .................. H01M 2/02; H01M 10/38; H01M 10/50
[52] U.S. Cl. .................. 429/179; 429/121; 429/123; 429/178
[58] Field of Search .............. 429/121, 179, 123, 180, 429/178

[56] References Cited

U.S. PATENT DOCUMENTS

| | | | |
|---|---|---|---|
| 1,089,549 | 3/1914 | Halbleib | 429/178 X |
| 1,683,529 | 9/1928 | Cohelan | 429/179 |
| 1,840,240 | 1/1932 | Ludewig | 429/121 |
| 1,903,448 | 4/1933 | Furtney | 429/179 |
| 2,019,823 | 11/1935 | Lewis | 429/178 |
| 2,159,042 | 5/1939 | Odell | 429/121 |
| 3,595,701 | 7/1971 | Lewis | 429/121 |
| 3,605,065 | 9/1971 | Shannon | 429/179 |
| 4,064,328 | 12/1977 | Allen | 429/121 |

Primary Examiner—Brian E. Hearn
Assistant Examiner—Stephen J. Kalafut
Attorney, Agent, or Firm—John Cyril Malloy

[57] ABSTRACT

An improved battery comprising a battery housing having three spaced positive terminals and three spaced negative terminals, with each of the terminals having a threaded recess adapted to receive, optionally, a threaded terminal post or a threaded terminal plug for optionally selecting a pair to be utilized, and an adapter within the battery energizing the positive terminals commonly and a second adapter energizing the negative terminals.

2 Claims, 8 Drawing Figures

BATTERY

FIELD OF THE INVENTION

This invention relates to batteries.

BACKGROUND OF THE INVENTION

As is well known among those who sell batteries to the public, there are, generally speaking, three types of batteries which are purchased, first, those with a pair of spaced terminals adjacent the rear wall, second, those with a pair of spaced terminals adjacent the front wall, and third, those with a pair of terminals in the front wall adjacent the top wall. These batteries are utilized to fit the requirements of various vehicles. The problem is, of course, that one is required to maintain a supply of each of the types of batteries which occupy a substantial amount of floor space and tie-up substantial sums of money in inventory.

SUMMARY OF THE PRESENT INVENTION

The present invention is of a battery which includes an adapter whereby a single battery may be utilized to meet the three major requirements enumerated above. It is composed of a battery housing having three positive terminals and three negative terminals which are internally interconnected by an adapter and wherein each of the terminals includes a threaded recess to optionally receive either a threaded terminal post or a threaded plug so that two of the terminals comprising a pair may be selected for use in a particular installation.

It is, accordingly, an object of this invention to provide an improved battery which is used in combination with an adapter which is internally arranged within the battery and wherein the terminals are composed of threaded recesses and the terminals are interconnected electrically by the adapter so that they can optionally be used as terminals by threaded receipt of a terminal post in any of the two pairs while terminal plugs are received in the terminals which are not being utilized.

In accordance with these and other objects which will become apparent hereinafter, the instant invention will now be described with reference to the accompanying drawings in which:

DESCRIPTION OF THE PREFERRED EMBODIMENT

Figure 1:
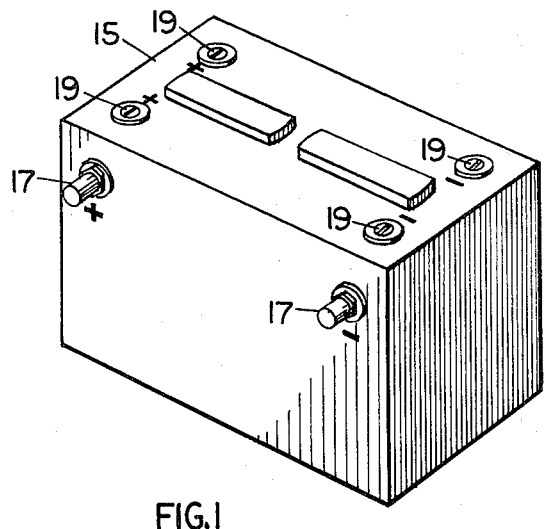
FIG. 1 is a perspective view of a battery showing terminal posts on the front wall.
Figure 2:
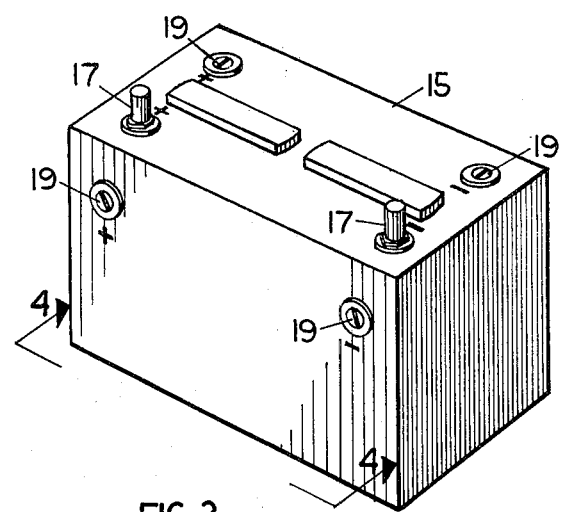
FIG. 2 is the same battery with the terminal posts arranged in the top wall in a first position.
Figure 3:
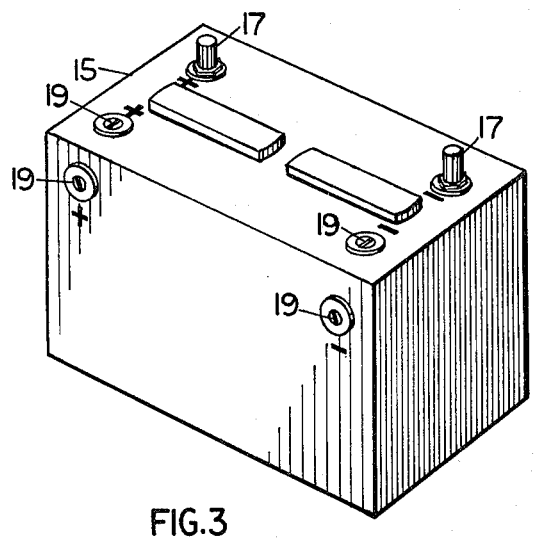
FIG. 3 is a view similar to FIGS. 1 and 2 and illustrating the terminal posts in a different pair of terminal positions.
Figure 4:
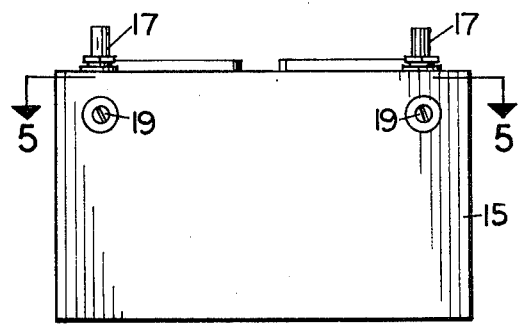
FIG. 4 is a front elevation view.
Figure 7:
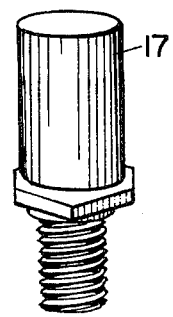
FIG. 7 is a perspective view illustrating a terminal post.
Figure 8:
FIG. 8 is a view illustrating a terminal plug.

Referring to the drawings wherein like reference characters designate like or corresponding parts throughout the several views and referring particularly to FIGS. 1, 2 and 3, there is shown a battery which includes a housing 15 composed of front, rear, opposing side, and a top and bottom wall which are closed and which define the battery case. The battery is provided with conventional openings, normally closed, as illustrated, for charging fluid into the battery. In the top wall there are provided four terminals which are designated by the numeral 19 and, additionally, in the front wall adjacent the top surface there are also four terminals designated by the numeral 19. Those on the left of FIG. 1, as indicated, are positive terminals while those on the right are negative terminals. Each of the terminals is provided with a threaded recess, see FIG. 5, sized for threaded receipt of either a terminal post 17, see FIG. 7, or a terminal plug, 19, see FIG. 8.

Figure 5:
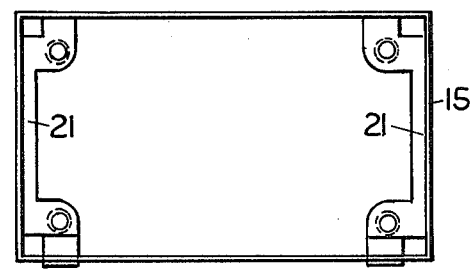
FIG. 5 is a view taken on the plane indicated by the line 5—5 of FIG. 4 and looking in the direction of the arrows.
Figure 6:
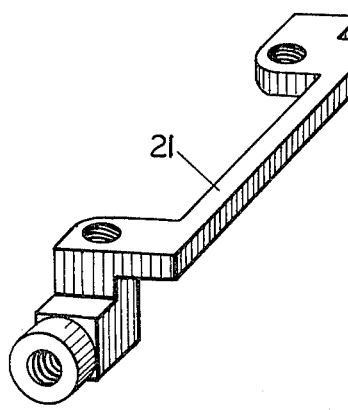
FIG. 6 is a perspective view of the adapter designated by the numeral 21 in FIG. 5.

As seen in FIG. 5, adapters designated by the numeral 21 are arranged within the battery housing adjacent the top wall, the adapters being of metal material and of the structure seen in FIG. 6 wherein the same are adapted to electrically energize all three of the terminals. Two terminals are selected and these two terminals are provided with the terminal posts 17 as shown in FIG. 1, for example, in the front wall. The plugs 19 are threaded into the recesses as shown in FIG. 1 in the top surface. This causes the active terminals for use to be those designated by the numeral 17 in FIG. 1. Optionally, the active terminals as represented by the terminal post 17 may be in the location shown in FIG. 2 or, optionally, in the location shown in FIG. 3. Thus, it is seen that by use of the adapter a battery is adapted to be utilized in three different ways to accommodate three different types of conventional uses. The adapter 21 as seen in FIG. 6 composes a bar having a pair of recesses in opposing relation spaced inwardly from the main length of the bar in a common direction to nest within the battery housing and being sized to span the same while there is a downwardly extending portion with an outwardly extending ear to be received through the front wall of the housing. It is thus seen that there has been provided an adapter for use in combination with a battery housing to provide a reduction in inventory for those required to store batteries in order to sell them to meet the requirements of customer's various types of automobiles.

While the instant invention has been shown and described herein in what is conceived to be the most practical and preferred embodiment, it is recognized that departures may be made therefrom within the scope of the invention, which is therefore not to be limited to the detailes disclosed herein but is to be accorded the full scope of the claims so as to embrace any and all equivalent apparatus and articles.

What is claimed is:

1. In combination, a battery and an adaptor means, said combination comprising:

(a) said adaptor means including a first adaptor element and a second adaptor element disposed in spaced apart relation to one another and each interconnected to said battery in current conducting relation thereto, (b) said battery comprising a substantially closed housing including at least a top, bottom, front and rear walls and a first side wall and a second side wall;

(c) a plurality of positive terminals integrally formed on said first adaptor element and further disposed in communicating relation with said top wall and front wall, (d) a first positive terminal disposed in communicating relation with said top wall and being positioned adjacent said first side wall and said rear wall, a second positive terminal disposed in communicating relation with said top wall and being positioned adjacent said first side wall and said front wall; and a third positive terminal being disposed in communicating relation with said front wall and being positioned adjacent said top wall and said first side wall;

(e) a plurality of negative terminals integrally formed on said second adaptor element and further disposed in communicating relation with said top wall and said front wall, (f) a first and a second negative terminal each positioned in communicating relation with said top wall, said first negative terminal being disposed adjacent said second side wall and said rear wall and said second negative terminal being positioned adjacent said second side wall an said top wall; a third negative terminal disposed in communicating relation with said front wall and positioned adjacent said side wall and said top wall, (g) each of said plurality of positive and negative terminals comprising a threaded recess of common size, (h) at least two terminal posts each including a threaded base dimensioned to fit within any of said threaded recesses; and at least four terminal posts each including a threaded exterior portion dimensioned to fit within any of said recesses, (i) one of said terminal posts secured within one of said plurality of positive terminals and the other of said terminal posts secured within a correspondingly positioned one of said negative terminals, and (j) each of said terminal plugs being secured within one of the remaining unoccupied terminals.

2. The combination of claim 1 wherein each of said adaptor elements comprises a bar formed of conductive material including an elongated configuration and each adaptor element including two ears, each located at opposite ends of said bar; one end of each adaptor element including a depending portion including one of said plurality of terminals being outwardly extended to receive one of said terminal plugs and terminal posts.

* * * * *